(12) United States Patent
Schulz et al.

(10) Patent No.: US 6,573,938 B1
(45) Date of Patent: Jun. 3, 2003

(54) SELF-CONTAINED CAMERA DEVICE AND METHOD FOR CAPTURING AND COMMUNICATING IMAGES VIA A MODEM

(75) Inventors: Gary Schulz, Cary, IL (US); Jan-Michael Wyckoff, Schaumburg, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/103,408

(22) Filed: Jun. 24, 1998

(51) Int. Cl.[7] .............................................. H04N 5/225
(52) U.S. Cl. ..................................... 348/373; 348/231.9
(58) Field of Search ....................... 358/906; 348/231.7, 348/373, 14.02, 231.8, 231.9; H04N 5/225

(56) References Cited

U.S. PATENT DOCUMENTS

| | | | | |
|---|---|---|---|---|
| 5,034,804 A | * | 7/1991 | Sasaki et al. ................ | 348/232 |
| 5,264,935 A | * | 11/1993 | Nakajima .................... | 358/906 |
| 5,561,458 A | * | 10/1996 | Cronin et al. ............ | 348/231.7 |
| 5,790,193 A | * | 8/1998 | Ohmori ...................... | 348/233 |
| 5,893,037 A | * | 4/1999 | Reele et al. ............. | 348/14.02 |
| 6,104,430 A | * | 8/2000 | Fukuoka ..................... | 358/906 |
| 6,278,481 B1 | * | 8/2001 | Schmidt ...................... | 348/233 |

* cited by examiner

Primary Examiner—Wendy R. Garber
Assistant Examiner—Jason Whipkey
(74) Attorney, Agent, or Firm—Randall S. Vaas; Lawrence J. Chapa

(57) ABSTRACT

A self-contained camera device (10) and method for capturing and communicating images via a modem (13). The self-contained camera device (10) comprises an image capturing device (15) and a chassis (11) for receiving a storage module or a modem (13). A removable modem (13) is mountable on the chassis (11) and couplable to the image capturing device (15). The removable modem (13) is replaceable with the storage module.

14 Claims, 5 Drawing Sheets

SELF-CONTAINED CAMERA DEVICE AND METHOD FOR CAPTURING AND COMMUNICATING IMAGES VIA A MODEM

FIELD OF THE INVENTION

The present invention relates to a self-contained camera device and method for capturing and communicating images via a modem.

BACKGROUND OF THE INVENTION

Currently, self-contained camera devices use external cabled connections to interconnect portable video cameras to radio frequency transmitters (typically analog video transmissions). These devices require dedicated redundant hardware to perform a dedicated function. A common application for such devices is for use in electronic news gathering activity and sports events.

Another application for a similar concept is in wireless in-home video distribution. In this application, a wireless video transmitter is cabled to a device such as a video cassette recorder (VCR), which enables the user to remotely view content without necessitating wiring a household. This application, however, requires a user to connect separate video and audio cables, as well as a power cable, to the host device resulting in a system that requires several pieces of equipment.

Thus, a need exists for a method and apparatus that provides an additional interface to the outside world without losing the functionality of a host device and provides for a way to achieve network connectivity for a consumer without the consumer having to purchase redundant hardware.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

The present invention allows for efficient re-use of any magnetically recordable media (e.g., consumer video or digital still camera equipment) by providing a means for additional external interfaces to networks, closed circuit televisions, monitoring, surveillance, commercial video market, etc. The present invention enables such an additional external interface to the outside world without losing the functionality of a host device (i.e., the magnetically recordable media).

The present invention provides for a generic interface that is applied to either digital or analog formats for both video and audio transmission. The present invention consists of the electronics necessary to interface the existing magnetic media electronics device with the outside world via a transport, wireless or wireline. The present invention allows the user of any magnetically recordable media to directly interface with the multimedia network by inserting a module or device in the form of a video or audio cassette and utilizing existing magnetic transducers to couple baseband modulation information to the transport.

Moreover, the present invention provides for a way to achieve network connectivity for the consumer without the consumer having to purchase redundant hardware. Thus, a person needs only one device with accessories to perform a multitude of functions. For example, a user of a camcorder is allowed to re-use the major components of the camera subsystem by removal of the cassette tape and the insertion of a modem.

The present invention utilizes a self-contained camera device which comprises an image capturing device and a chassis. The chassis receives a storage module (e.g., a tape cartridge) or a modem (wired or wireless). A removable modem is mountable on the chassis and couplable to the image capturing device. The removable modem is either a wireless radio frequency (RF) modem with a radio network interface and antenna or a wireline modem with a wireline network interface. Coupling the removable modem to the chassis allows the image capturing device to transmit images via the radio or wireline network interface. The removable modem is replaceable with a storage module. Preferably, the removable modem has an identical form factor as the storage module, including an identical input-output interface.

The removable modem utilizes existing hardware on the host device and provides an additional interface to the outside world in place of the functionality of the cassette tape transport mechanism. The removable modem takes on the mechanical configuration of a video, audio, digital audio tape (DAT) or similar cassette, and uses the existing consumer electronic tape drive as a docking station for a peripheral, e.g., 5 GHz wireless radio, infra-red or wireline modem with various interfaces, e.g., 10 base T or 1394. The installation of such a peripheral can be made connectorless since it utilizes the existing magnetic record heads of the host device.

Figure 1:
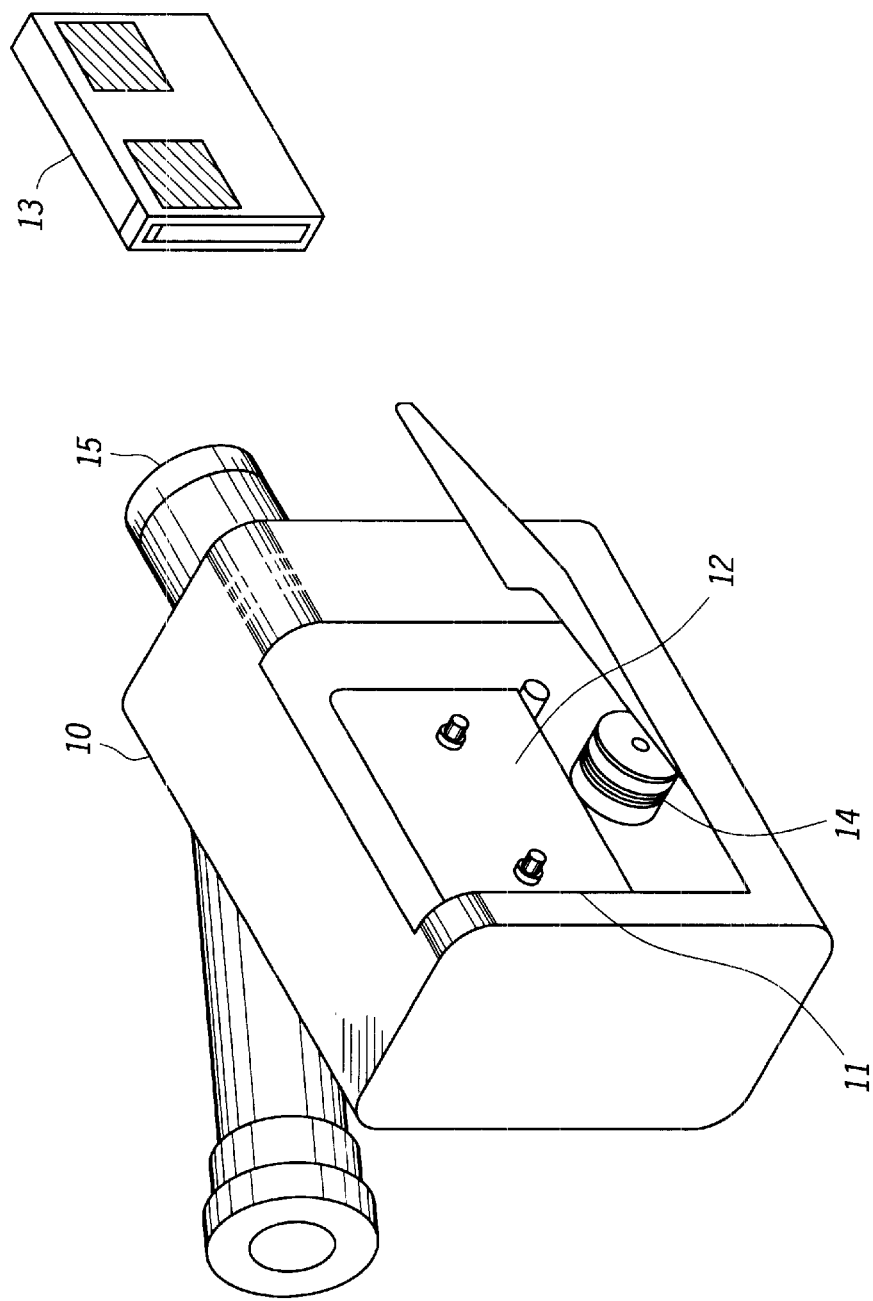
FIG. 1 is an isometric view of the preferred embodiment of the present invention.

As shown in FIG. 1, in the preferred embodiment of the present invention, the self-contained camera device 10 is a camcorder (i.e., host device) and the chassis 11 has a cavity 12 for receiving the storage module (not shown) or the removable modem 13. The cavity 12 is also adapted to receive a magnetic tape.

The cavity 12 includes a magnetic head 14 coupled to the image capturing device 15 of the host device 10. The magnetic head 14 couples a video signal, which originates from the host device 10, by picking up magnetic signals and duplicating the magnetic signals on the modem 13.

Figure 2:
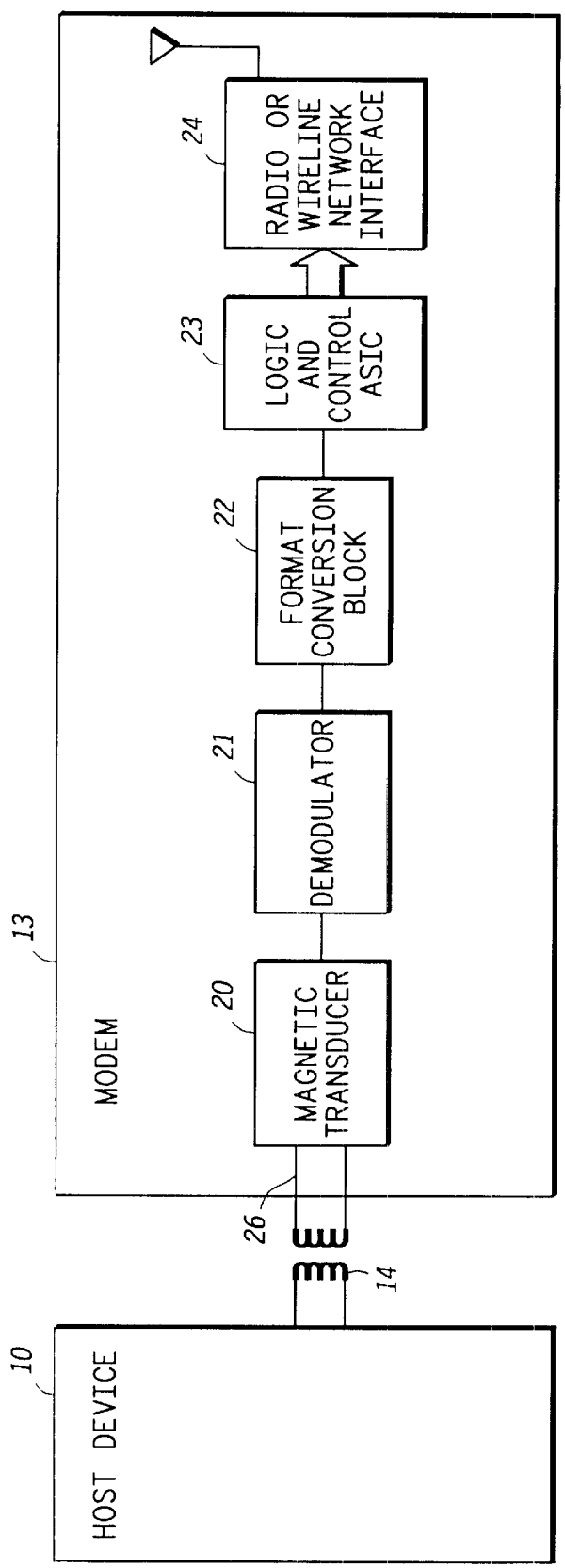
FIG. 2 is a block diagram of a modem located on a host device according to the present invention.

As shown in FIG. 2, the modem 13 consists of several components: a magnetic transducer 20, a demodulator 21, a format conversion block 22, a logic and control application specific integrated circuit (ASIC) 23, a radio or wireline network interface 24 (and an antenna 25, if utilizing the radio network interface). The magnetic transducer 20 is selectively and/or removably couplable to a magnetic head 14 within the cavity 12. A coil 26 is placed in the magnetic transducer 20 which picks up the magnetic signals generated by the magnetic head 14. The magnetic transducer 20 establishes connectivity with the host device 10 when the magnetic transducer 20 comes in contact with or comes within close proximity to the magnetic head 14 of the host device 10. After the magnetic transducer 20 picks up the magnetic signals from the magnetic head 14 of the host device 10, the magnetic signals need to be demodulated.

The demodulator 21 is coupled to the magnetic transducer 20. The demodulator 21 demodulates the magnetic signals picked up by the magnetic transducer 20 and converts them into baseband video signals. The demodulator 21 provides the baseband video signals to the format conversion block 22.

The format conversion block 22 is coupled to the demodulator 21. The format conversion block 22 is specific to the type of host electronic device 10 that the modem 13, or any other magnetic media housing, is plugged/inserted into. The format conversion block 22 presents the demodulated video baseband information in a baseband format ready for digitization by the video encoder/compression engine which is part of a very large scale integration (VLSI) ASIC.

The logic and control ASIC 23 is coupled to the format conversion block 22 and receives the baseband format from the format conversion block 22. After format conversion, the digital video and audio are packetized by the logic and control ASIC 23 and presented to the radio or wireline network interface 24, i.e., 5 GHz radio. The logic and control ASIC 23 controls the rate of modulation to the radio or wireline network interface 24. For example, the logic and control ASIC 23 instructs the radio or wireline network interface 24 when to transmit and receive signals, queries the radio or wireline network interface 24 whether it received a packet, whether the packet contained errors, whether there was a collision, or whether the logic and control ASIC 23 needs to request that the packet is re-sent. Thus, the logic and control ASIC 23 helps manage the radio or wireline network interface 24 and data framing.

If transferring files over the Internet, an internet protocol (IP), a host device IP address and a destination device IP address are embedded or downloaded in the logic and control ASIC 23. Embedding or downloading such information enables the logic and control ASIC 23 to know how to format the files and where to send the information over the Internet.

The radio or wireline network interface 24 is coupled to the logic and control ASIC 23. The radio or wireline network interface 24 is either a point-to-point stand alone system or part of a multimedia network. When the radio network interface 24 is utilized, the radio network interface 24 transmits the digital signal to a destination device via the antenna 25. When a wireline network interface 24 is utilized, the wireline network interface 24 transmits the digital signal to the destination device via an infra-red or wireline interface (e.g., 10 base T).

Figure 3:
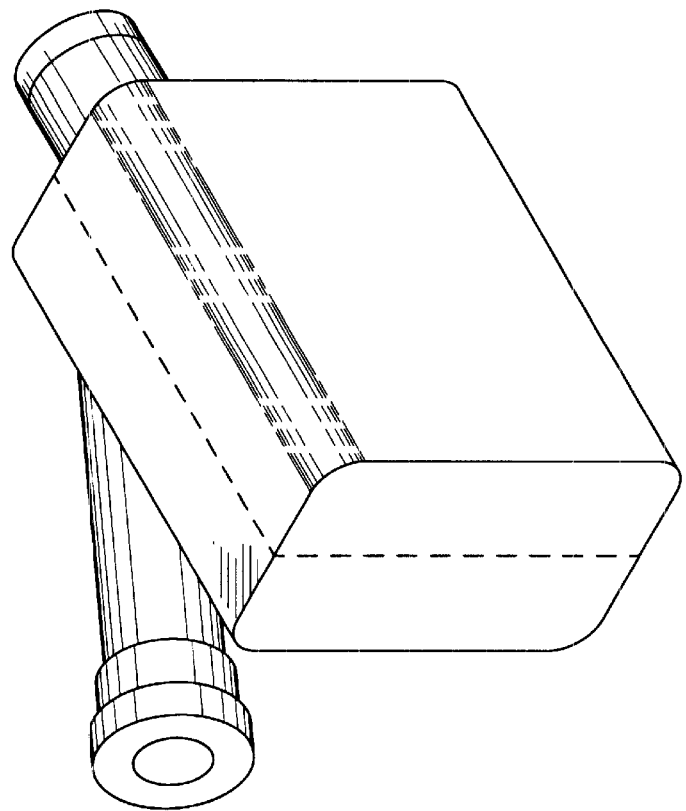
FIG. 3 is an isometric view of a first alternative embodiment of the present invention.
Figure 3:
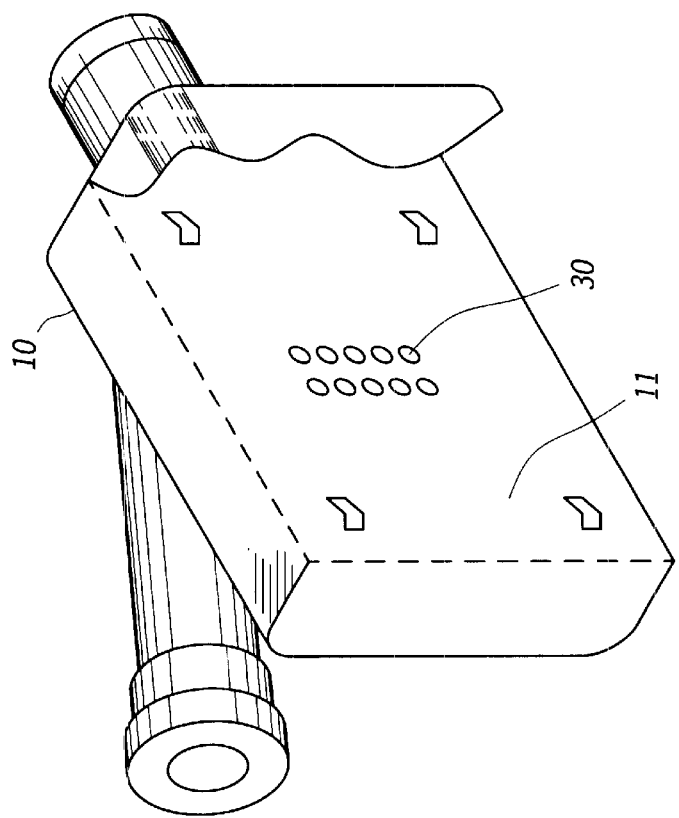

FIG. 3 illustrates an isometric view of a first alternative embodiment of the present invention. As shown, the chassis 11 of the host device 10 is adapted to receive a storage module (e.g., a semiconductor memory), a modem, or any other network interface. The chassis 11 comprises a set of electric contacts 30 for selectively connecting to the semiconductor memory, the modem or any other network interface.

Figure 4:
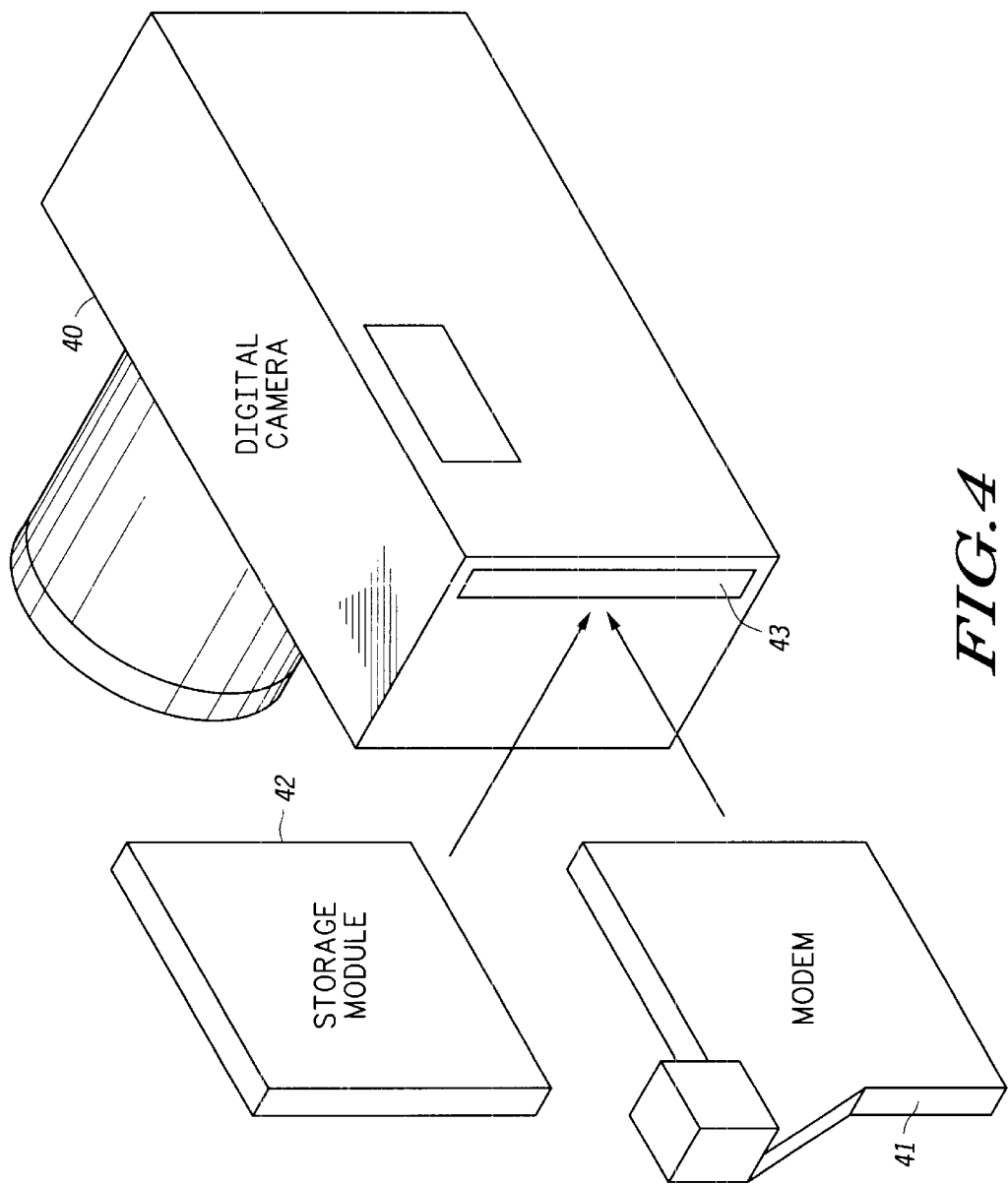
FIG. 4 is an isometric view of a second alternative embodiment of the present invention.

As shown in FIG. 4, a second alternative embodiment of the present invention is applicable as a radio or wireline network interface for digital still cameras 40. The components of the modem 41 in the second alternative embodiment are the same as in the preferred embodiment. The modem 41 is embedded in a module that also contains a mini flash storage interface. The modem 41 takes the place of the functionality of the storage module 42 and is inserted into the cavity 43 of the digital still camera 40. Embedding the modem 41 in a module that also contains a mini flash storage interface allows the present invention to take advantage of the mini flash storage interface standard which is available across numerous vendor platforms.

A third alternative embodiment (not shown) replaces the entire tape drive transport module with a modem. All video cameras use a multi-lead interface from the tape drive transport module back to the electronics of the self-contained camera. The present invention allows the tape drive transport interface to interface with the modem. The user can remove the tape drive transport module from the host device and insert a modem in its place. The modem has the same size, shape and form factor as the tape drive transport module and connects itself to the self-contained camera device via the multi-lead interface. Thus, the user can interchange the tape drive transport module with the modem depending on his need.

At this point, capturing and communicating images at the self-contained camera device has been described. The remaining description focuses on receiving the images transmitted from the self-contained camera device at a destination device (e.g., a personal computer).

Figure 5:
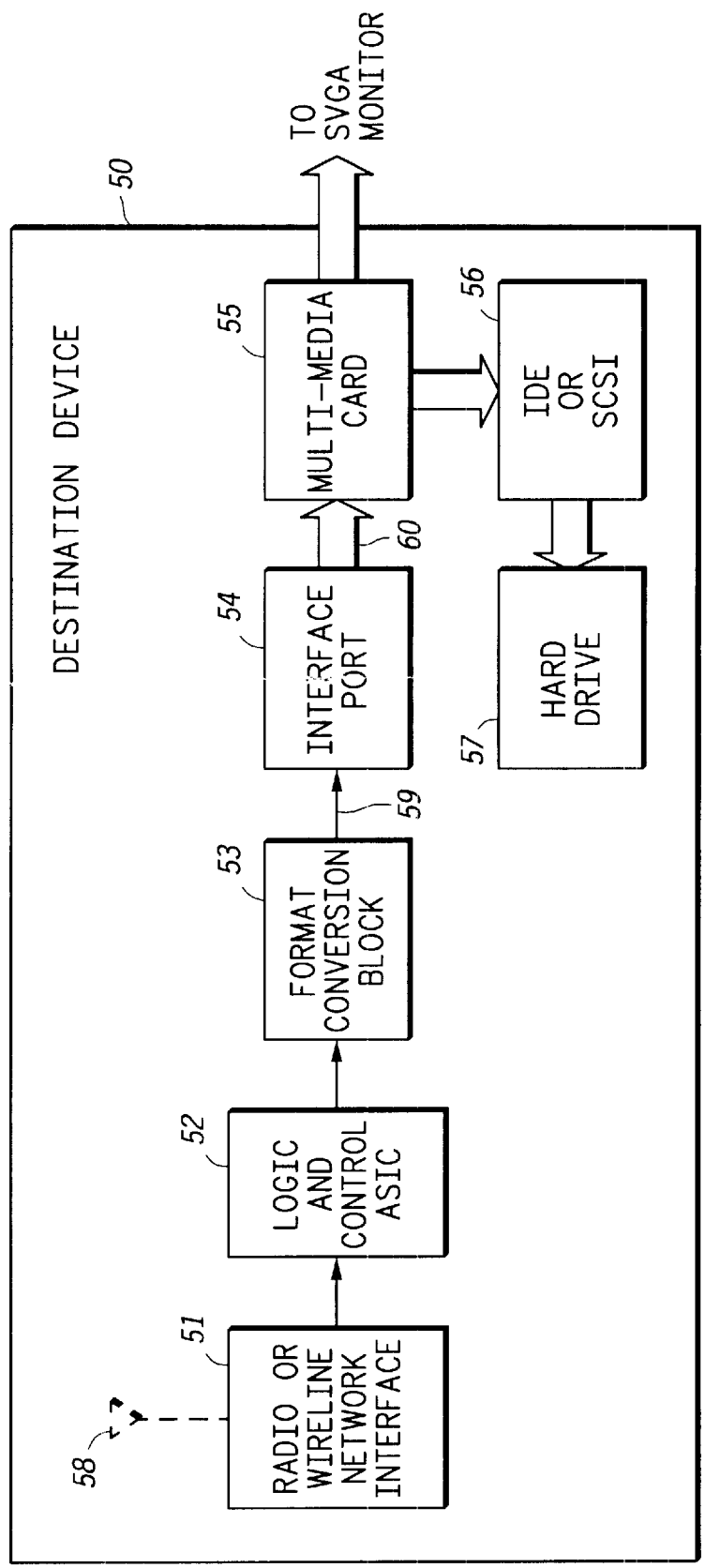
FIG. 5 is a block diagram of a destination device according to the present invention.

As shown in FIG. 5, the destination device 50 has common circuitry as the modem 13 located on the host device 10. Embedded in or mountable on the destination device 50 are the following components: a radio or wireline network interface 51, a logic and control ASIC 52, a format conversion block 53, an interface port (e.g., a network interface card) 54, a multimedia card 55, an integrated drive electronics (IDE) or small computer system interface (SCSI) 56, and a hard drive 57. The radio or wireline network 51 is in communication with the modem 13 via an antenna 58 or a wireline. The logic and control ASIC 52 is coupled to the radio or wireline network interface 51. The format conversion block 53 is coupled to the logic and control ASIC 52. The interface port 54 is coupled to the format conversion block 53 via a 1394, a 10 base T (e.g., Ethernet) or a high speed serial bus 59. The multimedia card 55 is coupled to the interface port 54 via a system bus, e.g., protocol control information (PCI) 60. The IDE or SCSI 56 and a super video graphics array (SVGA) monitor (not shown) are coupled to the multimedia card 55. The hard drive 57 is coupled to the IDE or SCSI 56.

In operation, using a radio network interface 51 and an antenna 58, the RF signals are picked up by the antenna 58 on the destination device 50 and are fed to a radio (e.g., 5 GHz radio). The radio network interface 51 down-converts the RF signals into baseband signals. The baseband signals are then fed into the logic and control ASIC 52. The logic and control ASIC 52 is able to read the data that comes over the baseband signals and strips out the data from the baseband signals to create raw data which is fed into the format conversion block 53. The format conversion block 53 converts the raw data into one of several standard data formats (e.g., 10 base T, 1394, high speed serial, etc.). The data flows from the format conversion block 53 to an interface port (e.g., network interface card) on the destination device 50. The data is then ported into a system bus 60 and into a multimedia card 55 by using the appropriate software application. The data is now able to be viewed on a computer monitor (e.g., a SVGA monitor) or stored on the system hard drive 57, or other media storage device (e.g., floppy disk, tape drive, etc.), that enables the user to view, manipulate and store the video data. It is important to note that the wireline network interface essentially operates in the same manner as the radio network interface. The wireline network interface, however, has a wired or infra-red connection to the destination device as opposed to a radio.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. For example, the present invention is also applicable to other forms of consumer imaging devices. The modem disclosed herein could take the form of a data storage card, personal computer memory card international association (PCMCIA) card or disk drive. The electrical and mechanical interfaces could be configured to be compatible with any of these standards. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A self-contained camera device for capturing and communicating images via a modem comprising:
    an image capturing device;
    a chassis for receiving a storage module or a modem; and
    a removable modem, mountable on the chassis and couplable to the image capturing device, wherein the modem is replaceable with the storage module; and
    wherein the self-contained camera device is a camcorder, which further comprises a removable tape drive transport module.

2. The self-contained camera device according to claim 1 wherein the wireless communication device is a wireless radio frequency modem.

3. The self-contained camera device according to claim 1 wherein the modem is a wireline modem.

4. A self-contained camera device for capturing and communicating images via a modem comprising:
    an image capturing device;
    a chassis for receiving a storage module or a modem; and
    a removable modem, mountable on the chassis and couplable to the image capturing device, wherein the modem is replaceable with the storage module; and
    wherein the chassis has a cavity for receiving the storage module or the modem, where the cavity is adapted to receive a magnetic tape.

5. The self-contained camera device according to claim 4 wherein the cavity includes a magnetic head coupled to the image capturing device and the removable modem comprises a magnetic transducer removably coupled to the magnetic head.

6. A self-contained camera device for capturing and communicating images via a modem comprising:
    an image capturing device;
    a chassis for receiving a storage module or a modem; and
    a removable modem, mountable on the chassis and couplable to the image capturing device, wherein the modem is replaceable with the storage module;
    wherein the chassis has a cavity for receiving the storage module or the modem; and
    wherein the removable modem comprises
        a magnetic transducer selectively couplable with a magnetic head within the cavity,
        a demodulator coupled to the magnetic transducer,
        a format conversion block coupled to the demodulator,
        a logic and control application specific integrated circuit coupled to the format conversion block, and
        a network interface coupled to the logic and control application specific integrated circuit.

7. The self-contained camera device according to claim 6 wherein the network interface is a radio network interface, and further comprising an antenna coupled to the radio network interface.

8. The self-contained camera device according to claim 6 wherein the network interface is a wireline network interface.

9. A housing for capturing and communicating images on a self-contained camera device via a modem comprising:
    a magnetic transducer for picking up a magnetic signal generated by a magnetic head of a host device;
    a demodulator for demodulating the magnetic signal picked up by the magnetic transducer to produce a video baseband signal;
    a format conversion block for formatting the video baseband signal;
    a logic and control application specific integrated circuit for packetizing the video baseband signal; and
    a network interface for communicating the video baseband signal to a destination device.

10. The housing according to claim 9 wherein the housing has a same shape and size as a magnetic cassette tape.

11. The housing according to claim 9 wherein the magnetic transducer comes in contact with the magnetic head of the host device to establish connectivity.

12. The housing according to claim 9 wherein the magnetic transducer is within close proximity to the magnetic head of the host device to establish connectivity.

13. A self-contained camera kit of parts comprising:
    a housing having image capturing capabilities and a chassis;
    a removable tape drive transport module; and
    a removable modem, wherein the removable tape drive transport module and the removable modem are alternatively mountable on the chassis.

14. A method of capturing and communicating images on a self-contained camera device via a modem comprising:
    entering a record mode;
    activating a magnetic head of a host device;
    utilizing a magnetic transducer to pick up a magnetic signal generated by the magnetic head of the host device;
    demodulating the magnetic signal picked up by the magnetic transducer to produce a video baseband signal;
    formatting and packetizing the video baseband signal; and
    communicating the video baseband signal through a network interface.

* * * * *